J. WOLFSON.
SIGNALING DEVICE.
APPLICATION FILED APR. 5, 1916.
1,226,429.
Patented May 15, 1917.
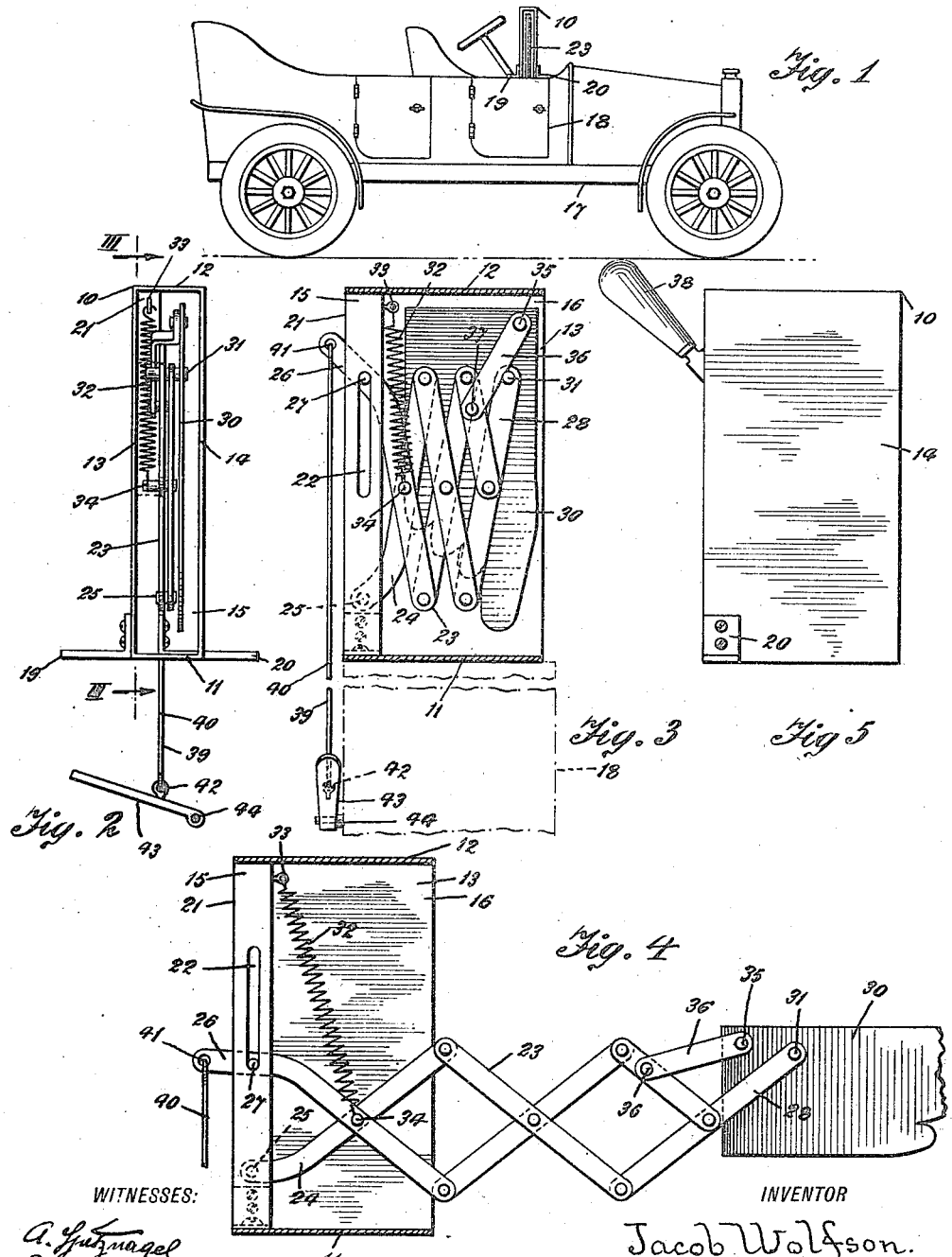
WITNESSES:
INVENTOR
Jacob Wolfson.
BY
ATTORNEY

UNITED STATES PATENT OFFICE.

JACOB WOLFSON, OF BROOKLYN, NEW YORK.

SIGNALING DEVICE.

1,226,429.  Specification of Letters Patent.  Patented May 15, 1917.

Application filed April 5, 1916. Serial No. 89,191.

*To all whom it may concern:*

Be it known that I, JACOB WOLFSON, a citizen of the United States, and a resident of New York, borough of Brooklyn, county of Kings, and State of New York, have invented a certain new and useful Improvement in Signaling Devices, of which the following is a full, clear, and exact specification.

This invention relates more particularly to a class of device adapted to be used in conjunction with vehicles.

My invention has for its object primarily to provide a signaling device designed to be applied to an automobile or other vehicle to indicate the direction in which the vehicle will be guided when changing its forward course while traveling, thereby tending to avoid accidents by permitting the persons in a vehicle which may be at the rear to discern the course the front vehicle is taking. The invention consists essentially of an element adapted to be arranged on a vehicle so as to be adjusted extensibly and contractibly in alternate longitudinal directions to extend laterally beyond the vehicle, and on this element is a signal which is swung in the arc of a circle from a folded position on the element when contracted to a position projecting outwardly in alinement with the element when extensibly adjusted for being observed at the rear of the vehicle.

Other objects of the invention are to provide means for operating the extensible and contractible element; to provide means for causing the signal to be swung in unison with the movements of the element; and to provide a signaling device of a simple, efficient and durable construction.

A practical embodiment of the invention is represented in the accompanying drawing forming a part of this specification in which similar characters of reference indicate corresponding parts in all the views, the said invention being more fully described hereinafter, and then pointed out in the claim at the end of the description.

In the drawing, Figure 1 is a side view of an automobile with one form of signaling device embodying my invention applied thereto.

Fig. 2 is a front elevation of the device.

Fig. 3 is a detail sectional view, partly fragmentary and partly broken away, taken on the line III—III of Fig. 2.

Fig. 4 is a detail sectional view, partly fragmentary, taken through the device when extensibly adjusted, and Fig. 5 is a side elevation of a slightly different form of the device.

The signaling device has a casing 10 which may be of any suitable shape and size, though this casing is preferably substantially rectangular to provide a bottom 11, top 12, and two spaced side walls 13 and 14, while the forward end 15 and the rear end 16 of the casing are open, as shown, to form a passage therethrough. One or more of the devices may be employed on an automobile or other vehicle, as 17, one device being preferably applied on the upper edge of the door 18 of the vehicle so as to be convenient for use by the chauffeur, or person operating the vehicle. The signaling device is rigidly supported on the door by providing two brackets, as 19 and 20, on the casing so as to extend in opposite lateral directions from the lower edge of the side walls 13 and 14 of the casing, and these brackets may be secured on the door of the vehicle by screws, bolts, or other suitable means.

In the casing 10 at its rear open end 16 is a vertically disposed support, or bar 21, and in the central part of this bar 12 is a slot 22 also vertically disposed to serve for guiding the movements of an extensible and contractible element, as 23. The element 23 is preferably somewhat in the form of an ordinary lazy tong, as illustrated, with the rear end, as 24, of one of its complemental members being pivoted, at 25, to the lower part of the support, or bar, while on the rear end, as 26, of the second complemental member of the lazy tong is a projecting pin 27 movably disposed through the slot 22 of the support 21. The lazy tong is thereby connected to this support so as to be alternately adjusted extensibly and contractibly in the casing inwardly and outwardly in a longitudinal direction through its open forward end 15. The element, or lazy tong 23 is of a size that when collapsed it will be confined in the casing 10 for being hidden from view, and when extensibly adjusted its opposite end will extend some distance laterally from the casing as well as laterally with respect to the door and body of the vehicle. The rear end 26 of the second complemental member of the lazy tong is of a length to extend out of the rear opening of the casing and for some distance therebeyond.

The forward end, as 28, of the first complemental member of the element, or lazy tong 23 is also extended, and on this extended end is a signal, as 30, to indicate the direction which the vehicle will be guided when about to be steered from the course in which it may be traveling. The signal 30 may be in the shape of a hand with pointed fingers made of sheet metal, or other material, or the signal may be of any other desired shape, and the upper rear portion adjacent to the central part of the signal, or hand is pivoted, at 31, to the extended end 28 of the second complemental member of the lazy tong so that the signal will be disposed in a folded or overlapping position on the lazy tong when collapsed in the casing 10. Furthermore, the signal, or hand will by this arrangement be disposed in the casing with its fingers pointing downwardly, as shown in Fig. 3, and also when the lazy tong is collapsed in the casing the rear ends 25 and 26 of the members of the tong will be spread apart.

The lazy tong 23 with the signal 30 are normally held in collapsed, or folded position in the casing 10 for being hidden from view, and to yieldingly retain these parts in this manner, a spring 32 is provided. One end of the spring 32 is held at 33 to the upper part of the support, or bar 21 in the casing, and the other end of the spring is held, at 34, to the rear part of the lazy tong, the tension of this spring normally acting to force the lazy tong inwardly of the casing.

In order to swing the signal 30 in the arc of a circle from a folded position on the lazy tong when contracted in the casing 10 to a position projecting outwardly in alinement with the lazy tong when extensibly adjusted for being observed from the rear of the vehicle, as shown in Fig. 4, to the rear portion of the upper part of the signal 30 is pivoted, at 35, one end of a link, or bar 36 having its other end pivoted, at 37, to part of the second member of the lazy tong which is in proximity to the forward end 28 of the first member of the tong.

Serving to allow the element, or lazy tong 23 and the signal 30 to be operated in unison for displaying the signal in emergency, I provide manually operative means in the form of a handle, as 38, arranged on the end 26 of the lazy tong which extends from the rear open end of the casing. This handle normally extends upwardly so as to be within easy reach for operation by a hand of the person steering the vehicle, or instead of the handle 38 the signal may be set preferably by foot operative means, as 39. The foot operative means 39 consists of a rod 40 having its upper end movably connected, at 41, to the end 26 of the lazy tong, and the lower end of this rod is movably connected, at 42, to the central part of a foot pedal 43. The rod 40 and foot pedal 43 are disposed interiorly of the vehicle, and one end of the foot pedal is pivoted, as at 44, so that its other end will be at an elevation as well as being adapted to be engaged by the foot of the person steering the vehicle, the rod 40 being of a length to normally hold the pedal in this position. When the handle 38 or the pedal 43 with the rod 40 are directed downwardly the extending rear end 26 of the second member of the lazy tong will also be moved downwardly toward the rear end of the first member of the lazy tong. The lazy tong will thereby be extensibly adjusted longitudinally so that its forward end will move outwardly of the casing through its front end, and the signal 30 will be likewise guided as well as being swung in the arc of the quadrant of a circle by the similar movement of the link 36. When the lazy tong is extended its maximum length the signal 30 will extend from the lazy tong in alinement outwardly therefrom for being easily observed from the rear of the vehicle, and when the handle 38 or foot pedal 43 are released the tension of the spring 32 will cause the signal 30 and the lazy tong 23 to be reversely moved in unison to collapsed positions interiorly of the casing 10. Thus a signaling device of a simple and efficient form is provided for use on an automobile or other vehicle whereby a warning may be given to indicate the direction in which the vehicle may be steered when traveling in order to avoid accidents by permitting persons at the rear to observe the actual course of the vehicle.

Having thus described my invention, I claim as new and desire to secure by Letters Patent:—

In a signaling device, a casing, a lazy tongs having one end secured within the casing, said lazy tongs lying normally within the casing and adapted to be swung horizontally outwardly therefrom, means for swinging said lazy tongs to open position, a signal pivotally secured to the free end of a last link of the lazy tongs and normally resting in substantially vertical position, and a link independent of the lazy tongs structure having one end pivotally connected to one link of the lazy tongs and having the other end thereof pivotally connected to the signal at a point removed some distance from the pivot point of the signal and lazy tongs, whereby the signal will be caused to swing in the arc of a circle when the lazy tongs is moved to open position so as to lie in horizontal alinement therewith.

This specification signed and witnessed this fourth day of April, A. D. 1916.

JACOB WOLFSON.

Witnesses:
A. WOLFSON,
GEORGE F. BENTLEY.